US007583409B2

(12) United States Patent
Morgana et al.

(10) Patent No.: US 7,583,409 B2
(45) Date of Patent: Sep. 1, 2009

(54) PATCH CODES WITH IMPROVED ROBUSTNESS

(75) Inventors: Stephen C. Morgana, Rochester, NY (US); R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 327 days.

(21) Appl. No.: 11/710,778

(22) Filed: Feb. 26, 2007

(65) Prior Publication Data

US 2008/0204773 A1 Aug. 28, 2008

(51) Int. Cl.
  *H04N 1/00* (2006.01)
  *H04N 1/46* (2006.01)
  *G03F 3/08* (2006.01)
  *G06K 9/00* (2006.01)
(52) U.S. Cl. .................. 358/1.9; 358/504; 358/3.23; 358/517; 358/518; 358/530; 358/537; 358/1.6; 382/162; 382/167
(58) Field of Classification Search .................. 358/1.9, 358/504, 3.23, 517, 518, 530, 537, 1.6; 355/38, 355/77; 382/162, 167
See application file for complete search history.

(56) References Cited

U.S. PATENT DOCUMENTS 4,929,978 A * 5/1990 Kanamori et al. ............. 355/38

| 6,163,389 A | 12/2000 | Buhr et al. |
| 6,473,199 B1 | 10/2002 | Gilman et al. |
| 6,972,867 B1 | 12/2005 | Venable et al. |
| 2006/0028699 A1 | 2/2006 | Venable et al. |

FOREIGN PATENT DOCUMENTS

| WO | WO 98/50882 | 11/1998 |
| WO | WO 00/44164 | 7/2000 |

OTHER PUBLICATIONS

J.A.Brzozowski, M.Yoeli, *Digital Networks, Errors and Hazards*, Chapter 10, pp. 330-345, Prentice-Hall, Inc., New Jersey, 1976.

* cited by examiner

*Primary Examiner*—Edward L Coles
*Assistant Examiner*—Charlotte M Baker
(74) *Attorney, Agent, or Firm*—Fay Sharpe LLP

(57) ABSTRACT

A method for encoding information on a printed page includes generating a set of color patches, each having a unique color. The set of color patches is printed. The printed color patches are scanned to identify color values for each patch in the set of patches. For each patch, the identified color values are associated with a datum value in a data structure. A page which includes a patch code is printed. The patch code includes selected ones of the set of color patches for conveying information about the printed page. The printed page is scanned to identify the color values for the color patches in the patch code. The data structure is accessed to identify the data values for the identified color values of the patches in the patch code. Information about the printed page is determined from the identified data values.

23 Claims, 3 Drawing Sheets

PATCH CODES WITH IMPROVED ROBUSTNESS

BACKGROUND

The exemplary embodiment relates to the use of color patch codes in a printed image for conveying information about the content of the image. In particular, it relates to patch codes for color calibration job identification encoding, although it is to be appreciated that the exemplary embodiment has other applications.

Typically, there are two phases involved in the color correction of a color printer: calibration and characterization. Calibration involves maintaining the printer at a defined state, while characterization involves determination of the multidimensional transformation or profile that relates device color signals (e.g., CMYK) to spectrophotometric or calorimetric signals (e.g. CIELAB). Typically, characterization is performed relatively infrequently, sometimes only once at the factory that produces the printer. Calibration, on the other hand, needs to be performed frequently to compensate for printer drift and bring the device back to its nominal state. While the term calibration will be used throughout this application, the ideas also apply equally to the characterization process.

The calibration process typically involves sending an image with pre-specified device signals (i.e., a target) to the printer, and making spectrophotometric measurements of the print with the use of a sensor, which may be a spectrophotometer, or a scanner, such as an RGB desktop scanner, or any other device capable of sensing color signals at specified locations on the page. The device and spectrophotometric signals together are used to build or update the calibration tables.

When more than one page is used in color calibration, such as when calibrating multiple printers, or using multiple calibration sheets per printer, there is the opportunity for human error in which the pages get mixed up and the wrong calibration(s) result. Patch codes have been developed as a means for providing automation to the color printer calibration process, allowing job identification data and other information to be encoded according to a scheme in which the data is printed according to a protocol and in a format approximately identical to a format of the calibration target. Typically one bit per CMY separation is encoded per patch. Even with only one bit per separation, variations between printer models are sufficient to cause occasional read errors. One solution is to reduce the number of colors further e.g., by eliminating blue, which is too similar to black on some printers, or hand tune the colors to be more distinct. As a consequence, more patches are required to convey the information, occupying a significant portion of the page area.

INCORPORATION BY REFERENCE

The following references, the disclosures of which are incorporated herein in their entireties by reference, are mentioned:

U.S. Pat. No. 6,972,867 issued Dec. 6, 2005, and Divisional Application 20060028699, both entitled PATCH CODES FOR COLOR CALIBRATION JOB IDENTIFICATION ENCODING, by Venable, et al., disclose a color calibration job identification system and method in which job identification data is encoded on a printed page, in a patch code, along with color targets. The patch code includes a first portion, including a start code, and a second portion, including job identification data. The first and second portions of the patch code each include two or more small color patches, each having a predefined color.

BRIEF DESCRIPTION

In accordance with one aspect of the exemplary embodiment, a method for encoding information on a printed page includes generating a set of color patches, each having a unique color, printing the set of color patches, and scanning the printed color patches to identify color values for each patch in the set of patches. For each patch, the identified color values are associated with a datum value in a data structure. A page is printed which includes a patch code. The patch code includes selected ones of the set of color patches for conveying information about the printed page. The printed page is scanned to identify the color values for the color patches in the patch code. The data structure is accessed to identify the data values for the identified color values of the patches in the patch code. Information about the printed page is determined from the identified data values.

In accordance with another aspect of the exemplary embodiment, a computer program product encodes instructions, which when executed on a computer causes information to be encoded on a printed page. The instructions include instructions for incorporating a patch code into a page to be printed, instructions for accessing a data structure which stores color values and associated data values to identify data values for color values of the patches in the patch code generated by scanning the page when printed, and instructions for determining information about the printed page from the identified data values.

In accordance with another aspect of the exemplary embodiment, a calibration system for a printer includes a color patch generator for generating color patches from a set of color patches, each of the patches in the set having a unique color. A data structure stores scanned color values generated by scanning a printed set of the color patches. The data structure associates, for each patch in the set, a datum value with the color values of the scanned patch. A patch code identifier which receives color values for a scanned calibration page printed by the printer and accesses the data structure for decoding a patch code on the printed page. The patch code includes patches selected from the set of patches, the decoded patch code providing information about the scanned printed calibration page.

In accordance with another aspect of the exemplary embodiment, a method for encoding information on a printed page includes receiving a data structure associating color values with datum values, printing a page which includes a patch code, the patch code including selected ones of the set of color patches for conveying information about the printed page, scanning the printed page to identify the color values for the color patches in the patch code, accessing the data structure to identify the data values for the identified color values of the patches in the patch code, and determining information about the printed page from the identified data values.

DETAILED DESCRIPTION

Figure 1:
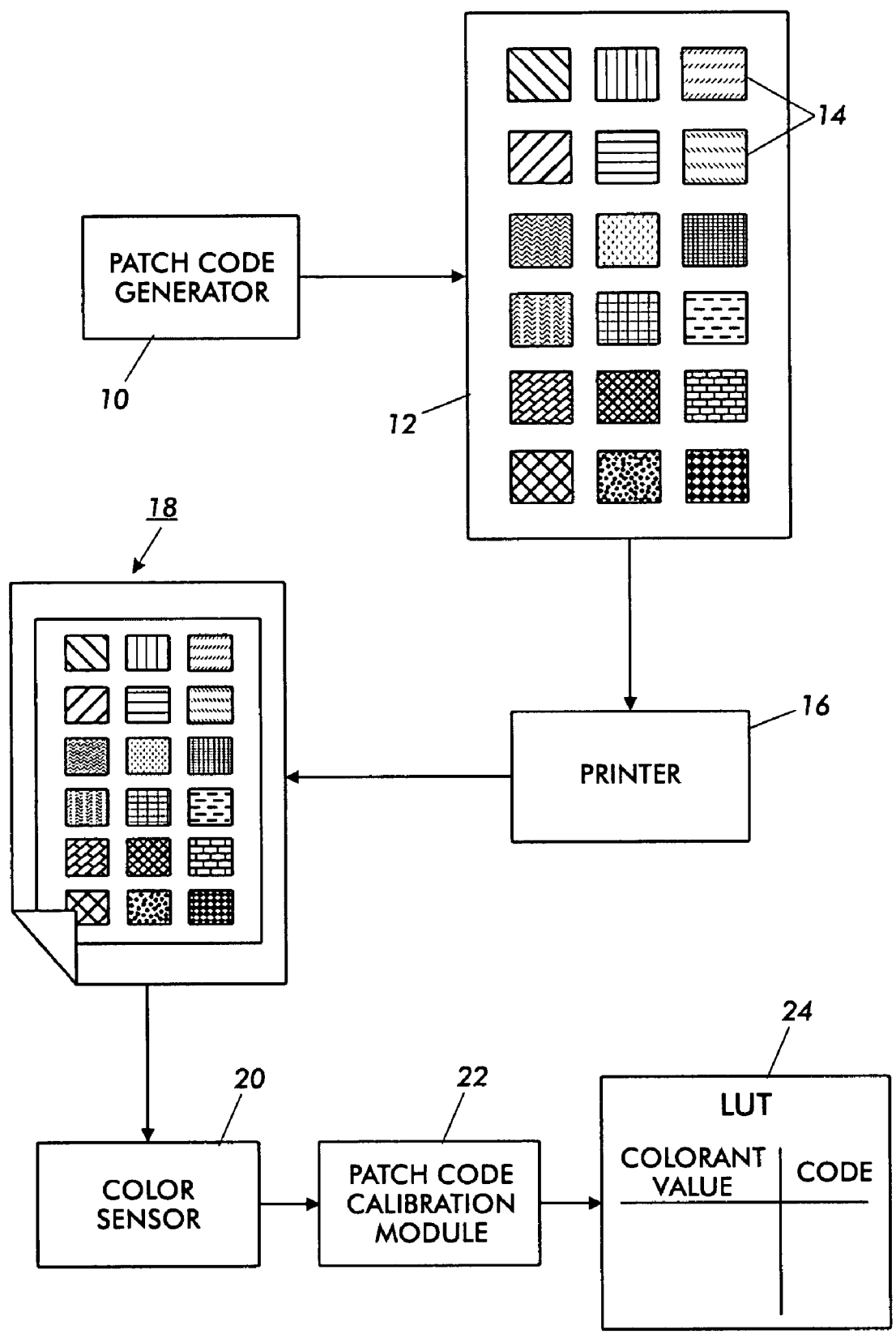
FIG. 1 illustrates an exemplary protocol for encoding data values into patch codes.

Aspects of the exemplary embodiment relate to a system and method for encoding information on printed pages in the form of patch codes.

Patch codes comprise at least one and typically a plurality of small color patches printed on a hardcopy sheet for conveying information about the content of the sheet. In the exemplary embodiment, the content is a calibration target comprising a set of color patches, although it is to be appreciated that the content may be text, images or a combination thereof.

The patches used in generating a patch code are selected from a set of patches. Each patch in the set is associated with a particular code value—typically a numerical value or other unique datum value. Each patch in the set has a color which is distinguishable from the colors of other patches in the set, when printed by a printer, whether or not the printer has been calibrated. A patch code calibration system assigns a code value to the printed patch, based on sensed color values.

The patch code finds application in color calibration of printers. For color calibration applications, in order to maximize robustness, it is desirable to minimize the number of times a human operator has to manipulate printed pages. It is therefore advantageous to have a color sensor, such as a color scanner or a spectrophotometer, that scans for color values (calibration data) also scan for job identification information. A spectrophotometric scanner typically used for calibration moves to a particular coordinate and then commences scanning for color values. Coordinate information or other information can be used to distinguish patches in the patch code from patches in the calibration target.

In the exemplary embodiment, patches are generated with one or multiple bits per separation to encode eight or more values per patch. For example, for a system employing three separations, e.g., cyan, magenta, and yellow (CMY), patches may be generated with three values per separation with code values according to TABLE 1 below:

TABLE 1

| Code | Base 3 | C % | M % | Y % |
|---|---|---|---|---|
| 0 | 000 | 0 | 0 | 0 |
| 1 | 001 | 0 | 0 | 50 |
| 2 | 002 | 0 | 0 | 100 |
| 3 | 010 | 0 | 50 | 0 |
| 4 | 011 | 0 | 50 | 50 |
| 5 | 012 | 0 | 50 | 100 |
| 6 | 020 | 0 | 100 | 0 |
| 7 | 021 | 0 | 100 | 50 |
| 8 | 022 | 0 | 100 | 100 |
| 9 | 100 | 50 | 0 | 0 |
| 10 | 101 | 50 | 0 | 50 |
| 11 | 102 | 50 | 0 | 100 |
| 12 | 110 | 50 | 50 | 0 |
| 13 | 111 | 50 | 50 | 50 |
| 14 | 112 | 50 | 50 | 100 |
| 15 | 120 | 50 | 100 | 0 |
| 16 | 121 | 50 | 100 | 50 |
| 17 | 122 | 50 | 100 | 100 |
| 18 | 200 | 100 | 0 | 0 |
| 19 | 201 | 100 | 0 | 50 |
| 20 | 202 | 100 | 0 | 100 |
| 21 | 210 | 100 | 50 | 0 |
| 22 | 211 | 100 | 50 | 50 |
| 23 | 212 | 100 | 50 | 100 |
| 24 | 220 | 100 | 100 | 0 |

TABLE 1-continued

| Code | Base 3 | C % | M % | Y % |
|---|---|---|---|---|
| 25 | 221 | 100 | 100 | 50 |
| 26 | 222 | 100 | 100 | 100 |

The percentages represent the amount of each separation, with 0% representing none of the separation and 100% representing the maximum value. This set of 27 patch codes allows each patch to encode any one of twenty-seven unique values. It will be appreciated that there may be fewer or more than three values per separation, such as one, two, or four levels, and the amounts of each separation can be any suitable values. In the case of 4 levels, the levels of each separation may be for example, approximately 0, 33, 66, and 100%. Additionally, fewer or more than three separations may be employed. In general, if there are n levels in each of s separations, the number represented has s digits in a base-n representation.

Figure 2:
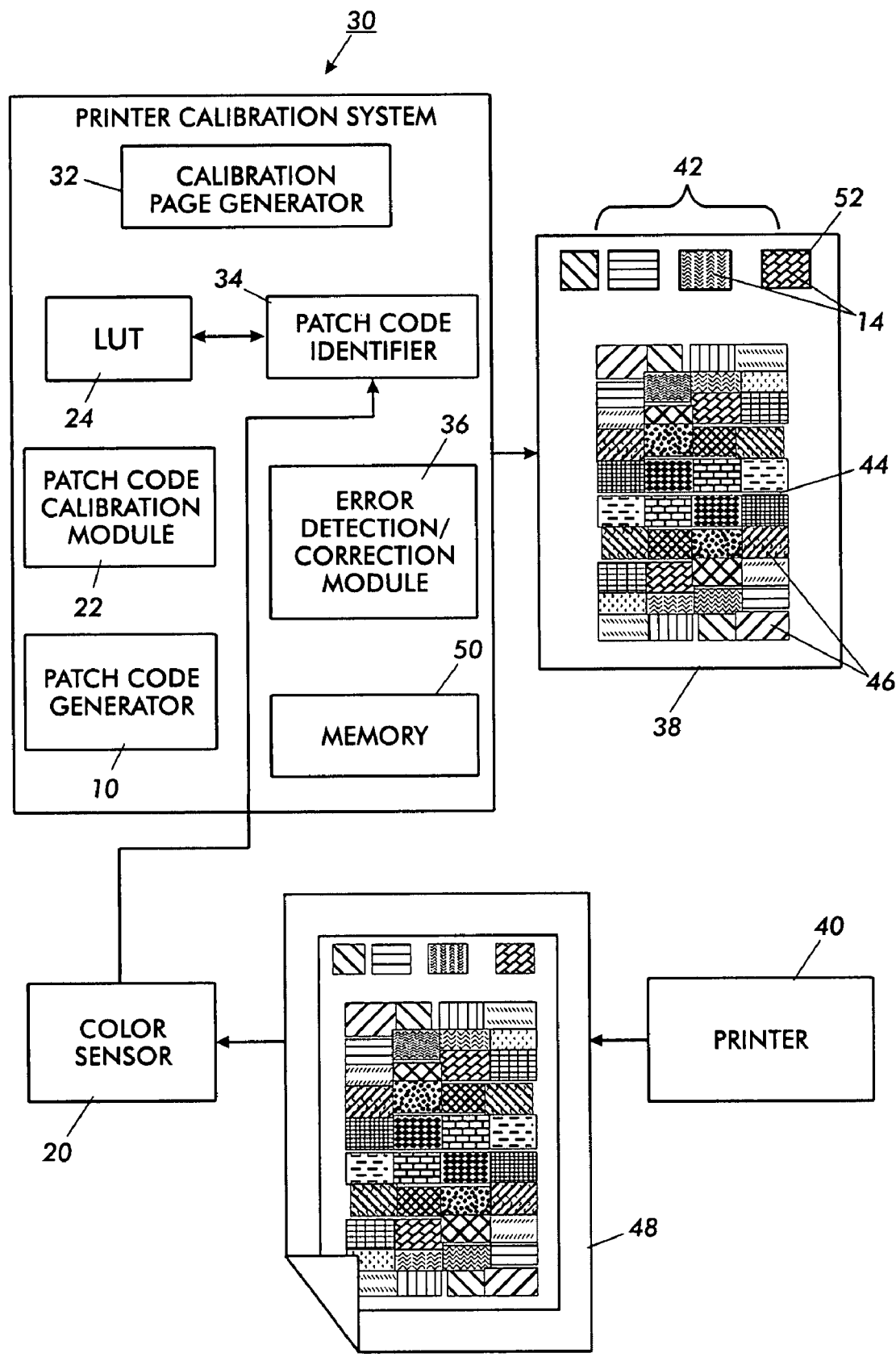
FIG. 2 depicts an exemplary environment in which a calibration system for a printer operates.

A functional block diagram of an exemplary protocol for calibrating color patches to be used in patch codes is shown in FIG. 1. A patch code generator 10 generates a patch code calibration page or pages 12 which includes patches 14 for each of the codes in the set. Normally, each color patch is a different color, however, to distinguish each of the colors for purposes of representation herein in black and white, each color is represented in FIG. 1 and FIG. 2 by a unique format of cross hatches, dots or other pattern. While FIG. 1 shows eighteen patches by way of example, it is to be appreciated that there may be many more patches, such as $n^3$ patches, where n can be from 3 to about 10, or more. Each of the patches 14 is represented at least once in the patch code calibration page(s) 12. The page 12 is sent as a print job in digital form to a printer 16, which renders the patch code calibration page on a suitable print medium 18, such as paper, using colorants such as toners. A sensor 20 senses the color values of the rendered calibration page 18. A patch code calibration module 22 stores the sensed color values in a data structure 24 in which the values are linked to the corresponding code value for the respective patch. The data structure 24 can be in any suitable format for associating a unique datum value with each of the patch colors in the set, and which can be accessed for retrieving the datum value of an input patch color, such as a simple look up table, search tree, or abstract dictionary.

The patch code calibration module 22 may know the approximate measured values corresponding to each code value and thus is able to match the sensed color values to the respective code values of each patch. Alternatively, the codes are matched by the known order in which the patches are located in the page. A rendition of a "good black" is thus not required, as whatever rendition is produced by default is the rendition that is measured and later recognized. For small numbers of patch codes (e.g. one or two bits per separation, or 8 or 64 codes), the measurements may be stored in a simple table 24 and searched by linear search. For larger numbers of patch codes, a more sophisticated data structure, such as an oct-tree, indexed by measurement values, can be built.

As illustrated in FIG. 2, a printer calibration system 30 for calibrating one or more printers includes a patch code generator 10, as previously described, optionally the patch code calibration module, a calibration page generator 32, a patch code identifier 34 in communication with the data structure 24, and optionally an error detection/correction module 36. The calibration page generator 32 generates a printer calibration page 38 for rendering on a printer 40 to be calibrated. Printer 40 can be the same printer 16 as is used for printing the patch code calibration page or may be a different printer, such as one which uses the same set of colorants and which may also be configured substantially similarly. The printer calibration page 38 includes a patch code 42 comprising a plurality of code patches 14. The patch code 42 may be generated by the patch code generator 32 by selecting ones of the set of patches 14 corresponding to a code for conveying information about remaining content 44 of the page 38. The patches comprising the patch code 42 may be located on the page in a predetermined location, such as the top of the page and may be arranged in one or more rows. As described in U.S. Pat. No. 6,972,867, a start code comprising color patches may be provided for identifying the location of the start of the patch code 42.

The remaining content 44 may comprise a calibration target which may include a set of calibration patches 46 that are used to calibrate the printer 40. The calibration patches 46 may be of similar size and shape to the code patches 14 and use similar colors. The code patches 14, however, can be distinguished from the calibration patches 46 by the patch code identifier 34. For example, the patch codes are distinguished from calibration patches by their location on the page and/or by a particular sequence of patches (the start code), which sequence indicates the start of the patch code. The patch code identifier 34 decodes the patch code in a scanned printed calibration page 48, e.g., by accessing the data structure 24 to identify code values for colors of those patches determined to be code patches. In the case of a simple table, the table 24 may be searched by linear search. For larger numbers of patch codes, where a more sophisticated data structure, such as an oct-tree, is used as the data structure 24, the data structure may be searched for all close colors, and the closest one of the list is identified when a patch is to be decoded. In this way, approximately three or more bits per separation may be printed and subsequently recognized with sufficiently good reproducibility despite page to page and within page variability of the printer 40.

The calibration patches 44 may be used to calibrate the printer 40 using information provided by the patch code 42.

The color sensor 20 used for the patch calibration may also be used for scanning of calibration pages 48 and may be a scanning spectrophotometer or RGB scanner. In general the scanning spectrophotometer 20 measures color values of light reflected from the printed page 48 at selected scanning spots across the entire printed page. For example, the spectrophotometer may have an aperture of about 4-6 mm. One such scanner is a Gretag spectrophotometer (from Gretag Imaging Inc.). The scanning spectrophotometer may output color values as spectral lines or may convert these to L*a*b* values or some other color format.

Use of a scanner of this type results in implementation of an encoding scheme that will function in the same mode as the target, wherein job identification data or other information is printed in the form of a patch code according to a protocol and in a format approximately identical to the format of the calibration data.

For some applications, optical sensor 20 may be a non-spectrophotometric scanner, such as an RGB scanner which outputs color values in RGB format. The scanner may scan with a frequency of 600 spots per linear inch, i.e., each spot is about 42 micrometers in size. While such a scanner has higher resolution, and could use any of many forms of identification, such as OCR, the software used for reading patches from a calibration page is readily adapted to read patch codes as well.

The printer can be any suitable device for marking a print medium, such as a xerographic printer, inkjet printer, bubble-jet printer, or the like using appropriate colorants, such as toners or liquid or solid inks. The printer can be a stand alone printer or a component of a multifunction device which may include printing, scanning, copying, and/or faxing capability. In a typical xerographic printer, for example, a photoconductive insulating member is charged to a uniform potential and thereafter exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with a developing material. Generally, the developing material comprises toner particles adhering triboelectrically to carrier granules. The developed image is subsequently transferred to a print medium, such as a sheet of paper, and fused thereto by applying heat to the toner with a heated roller and application of pressure.

The processing components 10, 22, 32, 34, 36 of the calibration system 30 may be embodied in a computing device or combination of computing devices, such as a general purpose computer, e.g., a desktop, laptop, palm device, or the like, or a dedicated computing device, for example, in the digital front end of the printer 16, 40 or in the optical sensor 20, in a network server, or the like. The processing components 10, 22, 32, 34, 36 may be in the form of one or more plug-in software components or hardware components. In the illustrated embodiment, the processing components 10, 22, 32, 34, 36 execute instructions for performing some of the steps of the exemplary method described with reference to FIG. 3. These instructions may be stored in memory, such as memory 50. While the processing components are described as separate entities it is to be appreciated that two or more of the components may be combined and that the components may be distributed among two or more computing devices.

Figure 3:
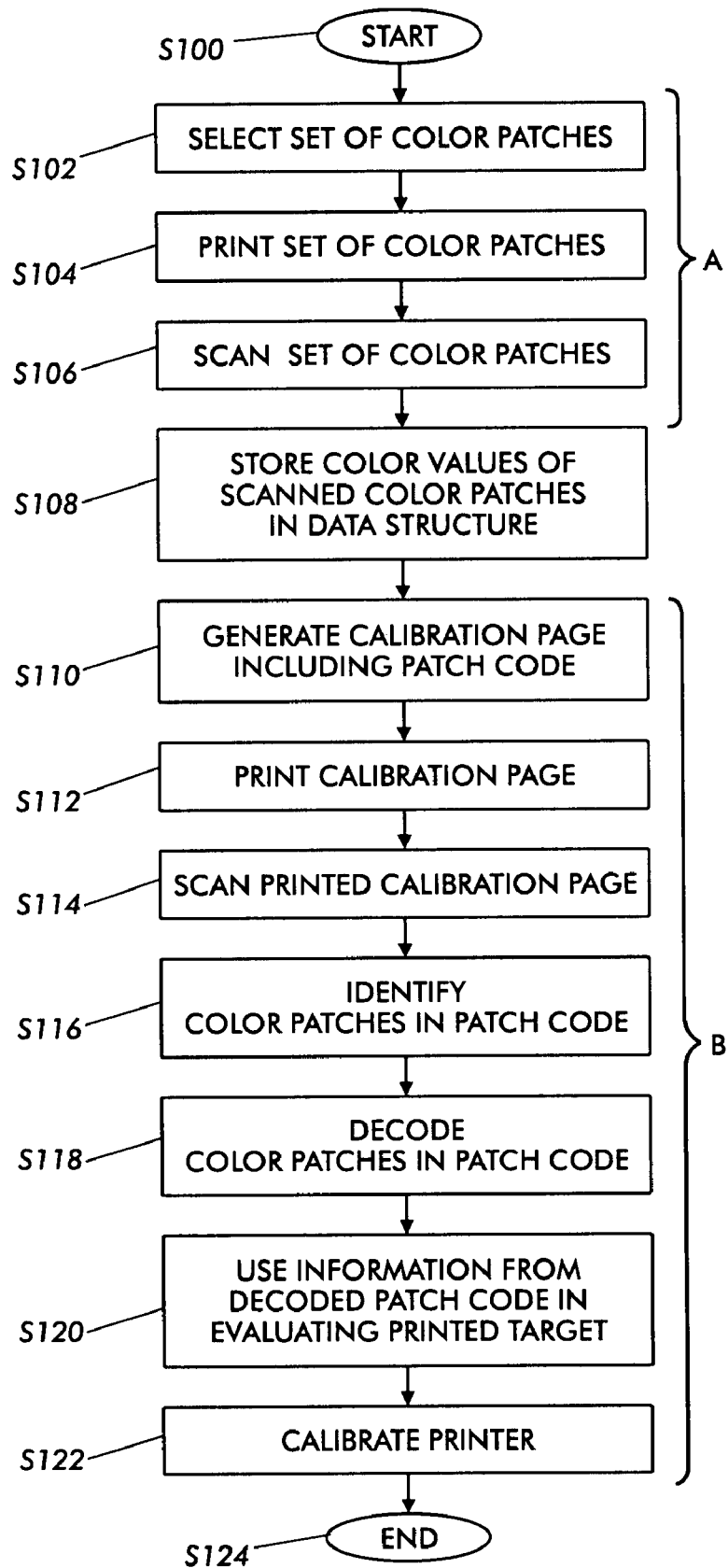
FIG. 3 illustrates an exemplary method for encoding information in a page to be printed in the form of a patch code.

FIG. 3 illustrates an exemplary method for encoding information in a page to be printed. The method may be performed with the apparatus of FIGS. 1 and 2. It will be appreciated that the method may include fewer, more, or different steps and the steps need not proceed in the order described. The method begins at S100.

The method includes two stages, a patch code calibration stage A and a printer calibration stage B. In the patch code calibration stage A, a set of distinguishable color patches may first be selected (S102). At S104, the selected color patches 14, each representing a unique code value, are printed one or more times. As will be appreciated, the printing may include generating a color patch calibration page (or pages) in digital form which includes the color patches in the set and generating a print job therefrom. This may include converting the patch code calibration page 12 into a format which is recognizable by the printer 16 and generating an associated print job description which provides instructions for the printer for printing the calibration page. The printer may convert the print job into a suitable format for printing which includes determining appropriate amounts of each of its available colorants for rendering the color patches in the calibration page, e.g., by accessing a tone reproduction curve (TRC).

At S106 the printed patches are scanned. The sensor 20 may output color values for the patches 14 in any convenient format, such as device independent values, such as CIE L*,a*,b* values or X,Y,Z values, or in a device dependent format, such as RGB or CMYK values. In the case of a scanning spectrophotometer, the color values may be in the form of raw spectrophotometric data. The color values output by the scanner 20 may be converted to values in a selected color space for storing in the data structure or may be used in their native format.

The scanned color values (or average values, where a patch is printed more than once) for each color patch are stored in a data structure 24 (S108). The data structure thus developed is later searched in the printer calibration stage B, when a patch code 42 is to be decoded.

In the exemplary embodiment, the printer 16, 40 need not be calibrated in the patch code calibration stage A. Raw CMYK values or other color data output from the sensor 20 can be used in generating the data structure.

The preliminary step (S102) may be performed to select a set of colors which are distinguishable. For example, all patches in a regular grid are printed. The grid may be an m×m×m grid of values of C, M and Y, where m may be, for example, from about 4 to about 20, such as an 8×8×8 grid. The printed patches are then all measured with the sensor 20. If any two adjacent colors are confusable colors. i.e., colors close enough together that print-to-print variation may create confusion, one of those colors is eliminated, along with all other colors in the three planes in which the eliminated color lies. For example, suppose that a color representing 20% cyan, 30% magenta, and 40% yellow is not readily distinguishable from the color representing 30% cyan, 30% magenta and 40% yellow. In this case, the second color may be eliminated, along with all other colors which use one or more of 30% cyan, 30% magenta, and 40% yellow. In this way, a regular grid of n×n×n patch colors is obtained, for some value of n, which can be at least about 4, such as at least 5. Alternatively, the two colors which are confusing can be replaced by a color which is between the two, such as their average. In the exemplary case, a set of color values employing about 25% cyan optionally replaces those with 20% and 30% cyan. In this case, the three new planes (containing the average) are printed and measured.

The printer calibration stage B utilizes the data structure 24 developed in stage A. At S110, a calibration page 38 is generated which includes a patch code 42 and a target 44 comprising calibration patches 46. This step may include converting job identification information and/or other information to a patch code 42, which is incorporated into the calibration page 38. The calibration page is sent to the printer and printed (S112). At S114, the printed page 48 is scanned by the sensor to provide readable spectrophotometric scan results, which are output by the sensor, including color values for the patch code 42 and target 44 according to their locations on the page. At S116 color patches 14 corresponding to the patch code 42 are identified and at S118 are decoded by accessing the data structure 24. At S120, the information contained in the code 42 may be used in interpreting color values from the scanned target 44.

In an alternative embodiment, the data structure 24 may be created with reference to a generic printer having behavior similar to the one to be calibrated. One way to do so is to print patches on one like printer, and then use these colors as representative of all printers of the same model. Another possible way is to use a previously derived printer model to predict the patch colors for the set of patches. Using a previously derived model also allows one to select separation levels that produce more uniformly spaced colors (in sensor space), thereby offering the possibility of encoding more values without the risk of confusing similar colors.

As will be appreciated, the primary function of the calibration stage B is to correctly calibrate the printer 40. This may include determining appropriate modifications to the printer's TRCs and/or printer hardware, based on scanned color values for the target patches (S122), as is known in the art. The information provided by the patch code 42 allows the calibration system 30 to correctly identify the printer 40 which generated the calibration page 48 and/or other information, such as the page of a calibration profile from which the calibration page was generated. This ensures that the appropriate modifications are made to the TRCs or printer hardware of the printer 40 which printed the page 48. The method ends at S124.

The method illustrated in FIG. 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The information contained in the patch code 42 may include one or more of the following:

a. A start code which identifies the start of the patch code. The start code may be placed in a fixed location relative to the remainder of the patch code, such as the first two or three color patches of the patch code. If the start codes are not encountered at the very beginning of the measurement file, the calibration system will assume an incorrect orientation of the target and may search for the start code elsewhere in the page and may reorder the data accordingly;

b. Job information, such as one or more of: the page of a printer calibration file, a printer serial number, a job ID, containing a unique ID used as a key to access a state of a given printer calibration, a date containing a print file creation time, a target type identifying what type of color target 44 is printed on a page containing the patch code 42, a type of medium on which the patches are to be printed; a sub ID, used to track experimental variations from the standard calibration path; and c. Verification information.

Each of these pieces of information may occupy one or more patches, depending on the number of patches required to convey the information. Since a large number of bits of information can be provided by a single patch, in some cases two or more pieces of information may be encoded in a single patch, such as a Job ID and page number. Further, one piece of information may be partially encoded in one patch and continued in another patch. There need be no connection between patches and pieces of information, as a patch code may be converted to a number, which, when interpreted as a string of bits, may represent any information that might be stored in an equivalent set of bits in a computer memory. In general, the entirety of the information to be transmitted using patch codes is first encoded in a string of digits, where each digit is in a base that matches the number of levels of a separation. For example, if there are three levels each of cyan and magenta, and two levels of yellow, three digits (two in base three and one in base two) are encoded in a single code patch. Extra unused color patches can be printed with any appropriate code color.

The verification information may provide error detection, such as parity checking. In one embodiment, a single patch 52 may encode a parity code which when summed with the codes of all the previous patches (or a subset thereof) results in an odd or even (0 or 1) sum in binary notation. In another embodiment, the parity bit is just one of many bits encoded in the patch 52, and all of the bits of patch 52 are included along with the encoded bits in other patches to determine a sum, which is even or odd. In one embodiment, one parity bit 52 may be employed per pair of data carrying patches. An error in the decoding of one of the preceding code patches by a value of 1 is thus detectable from a lack of matching of the parity bit with its designated even or odd parity. While summing of code values is one suitable function for checking parity, other functions, such as subtraction or multiplication, are also contemplated.

In one embodiment, the patch codes are further augmented with error correction bits to further increase robustness. The error correction bits allow incorrectly assigned code values to be corrected when one (and in some cases more than one) patch color is incorrectly decoded. For example, one or more patches may encode information which allows the assigned values of one or more other decoded patches to be corrected where an error is detected, e.g., through parity checking. Further information on error detection and error correction in data is to be found in Janusz A. Brzozowski and Michael Yoeli, "Digital Networks," chapter 10, "Errors and Hazards," pages 330-345 (Prentice-Hall, Inc., New Jersey, 1976).

Other information which can be included in the patch code as it suits the user's application is described, for example, in U.S. Pat. No. 6,972,867, incorporated by reference.

The exemplary method provides a very compact way of encoding a rich quantity of information relevant to printer calibration, such as the machine serial number, the page (if multiple pages are used in a calibration), and any other settings that might be of use in further processing.

While in the exemplary embodiment, the patch code 42 is used to provide information related to a calibration page 38, it is to be appreciated that patch codes may be used to provide information about the content of other pages to be printed, such as bank statements, stock trading reports, and the like, for data integrity or other purposes. The information provided by the decoded patch code may include, for example, information about the intended recipient, such as address information, or other information, such as the date, the source of the page, or the like.

As for the system of Venable, at al., the automation provided by the exemplary embodiment eliminates the need for an operator to keep track of all calibration pages manually, the source printer and targets for each page, and the results of spectrophotometric scanning of each target-containing page. In a production environment where perhaps 30 to 40 printers are being calibrated at any one time, there is a very real possibility that mishandling can occur, especially considering that many target types can be printed for each printer. Pages can be accidentally placed out of order, and target scanning results can consequently be associated with an incorrect printer or an incorrect target type. The exemplary embodiment allows such mishandling to occur. An operator can simply feed target-containing pages to a scanner, and the software of the exemplary calibration system can perform all of the tracking and identification details with a greatly reduced possibility for error.

The exemplary system and method have advantages over the system of Venable, et al. First, the present system allows an enlarged set of colors that are readily distinguished from each other when rendered on a printer. By increasing the information density of a single patch, less page space is consumed with patch codes. The second improvement is the use of error detection and correction codes. By adding parity checking and/or other error detection and correction codes, robustness is further assured.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for encoding information on a printed page comprising:

generating a set of color patches, each having a unique color, each patch representing a unique code value;

printing the set of color patches;

scanning the printed color patches to identify color values for each patch in the set of patches;

for each patch, associating the identified color values with a datum value in a data structure, the datum value being associated with the unique code value, whereby when combined with data values of others of the patches, information about a calibration page to be printed is conveyed;

with a device for marking a printing medium, printing a calibration page which includes a patch code, the patch code including selected ones of the set of color patches for conveying information about the printed page, the calibration page further including a target comprising color patches;

scanning the printed page to identify the color values for the color patches in the patch code and color values for the color patches in the target;

distinguishing the color patches in the patch code from the target color patches;

accessing the data structure to identify the data values for the identified color values of the patches in the patch code;

determining information about the printed calibration page from the identified data values; and calibrating the device which printed the calibration page using the color values for the color patches in the target and the determined information.

2. The method of claim 1 wherein the data structure comprises a look up table.

3. The method of claim 1, wherein method further comprises distinguishing the color patches in the patch code from the target color patches prior to accessing the data structure.

4. The method of claim 1, wherein the information determined from the patch code comprises job identification data for the calibration page.

5. The method of claim 1, wherein the information determined from the patch code includes at least one verification bit and wherein the method further includes detecting errors in which the data value of the verification bit is used as a check on data values of other bits of information conveyed by the patch code.

6. The method of claim 1, wherein the scanning includes scanning with a spectrophotometric scanner.

7. The method of claim 1, wherein the generating of a set of color patches includes excluding from the set, colors which are indistinguishable when printed and scanned.

8. The method of claim 1, wherein each patch of the patch code encodes one of at least twenty-seven unique data values.

9. The method of claim 1, wherein in the set of patches, at least three levels are encoded for each of at least three color separations.

10. The method of claim 1, wherein there are at least twenty-seven patches in the set of patches.

11. The method of claim 1 wherein the printing of the set of color patches and the printing of the page which includes the patch code are performed on the same printer.

12. The method of claim 1 wherein the scanning of the printed color patches and the scanning of the printed page are performed with the same sensor.

13. The method of claim 1 wherein the patch code comprises an array of color patches.

14. A method for encoding information on a printed page comprising:
  receiving a data structure associating color values of a set of printed color patches with datum values, each of the color patches in the set representing a unique code value, whereby ones of the patches are selectable to form a patch code for conveying information about other content of a printed page containing the patch codes by accessing the data structure to obtain the respective data values;
  with a device for marking a print medium, printing a page which includes a patch code, the patch code including selected ones of the set of color patches for conveying information about the printed page;
  scanning the printed page to identify the color values for the color patches in the patch code;
  accessing the data structure to identify the data values for the identified color values of the patches in the patch code; and
  decoding the patch code from the identified data values to determine information about the other content of the printed page.

15. The method of claim 14, further comprising constructing the received data structure using a printer model.

16. The method of claim 14, wherein the data structure is generated by scanning each of the color patches in the set more than once, averaging the color values for each patch, and storing the average color value in the data structure.

17. A calibration system for a printer comprising:
  a color patch generator for generating color patches from a set of color patches, each of the patches in the set having a unique color;
  a data structure which stores scanned color values generated by scanning a printed set of the color patches, the data structure associating, for each patch in the set, a datum value with the color values of the scanned patch, whereby, through selection of ones of the color patches, information about a calibration page is encoded; and
  a patch code identifier which receives color values for a scanned calibration page printed by the printer and accesses the data structure for decoding a patch code on the printed page, the patch code including patches selected from the set of color patches, the decoded patch code providing information about the scanned printed calibration page, the calibration page further comprising a target comprising color patches whose color values are used in calibrating the printer.

18. The calibration system of claim 17, wherein the color patch generator executes instructions for converting information about the calibration page into a patch code.

19. The calibration system of claim 17, further comprising a sensor which scans the printed calibration page and produces machine readable color values therefrom.

20. The calibration system of claim 17, wherein there are at least twenty-seven patches in the set of color patches.

21. The calibration system of claim 17, wherein at least one of the patches in the patch code comprises a parity bit and wherein the calibration system includes an error detection component which uses decoded information from the parity bit to check for errors in the decoded patch code.

22. The calibration system of claim 17, further comprising:
  a calibration page generator which generates a calibration page for rendering on the printer, the calibration page including the patch code and a calibration target comprising color patches.

23. A computer program product comprising a tangible computer-readable recording medium encoding instructions, which when executed on a computer causes information to be encoded on a printed calibration page, the instructions comprising:
  instructions for incorporating a patch code into a calibration page to be printed, the calibration page further including a target comprising color patches to be used in calibrating a device which prints the calibration page;
  instructions for distinguishing the color patches in the patch code from the target color patches;
  instructions for accessing a data structure which stores color values and associated data values, the data values in the data structure being selectable, by selection of ones of the patch code patches, to provide information about a calibration page which is to be printed, to identify data values for color values of the patches in the patch code generated by scanning the calibration page when printed; and
  instructions for determining information about the printed calibration page from the identified data values of the patch code patches.

* * * * *